United States Patent Office 2,777,546
Patented Jan. 15, 1957

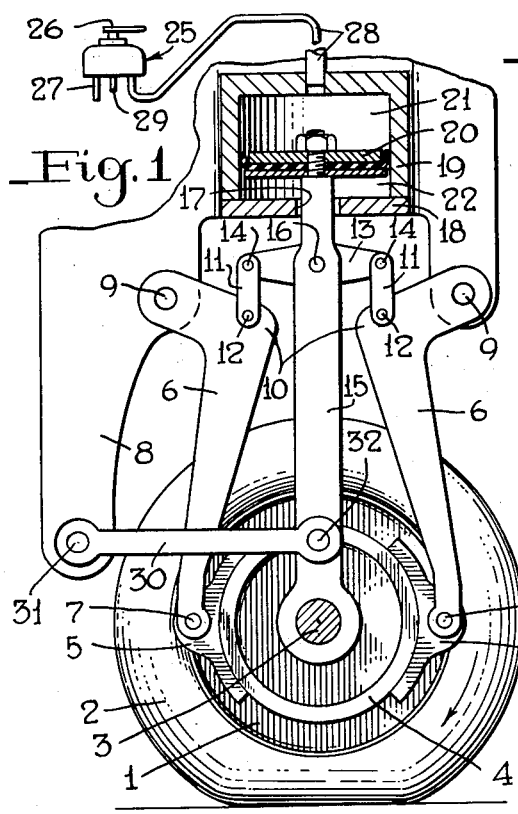
Jan. 15, 1957     C. S. KELLEY     2,777,546
AIRPLANE BRAKE EQUIPMENT
Filed March 27, 1953
INVENTOR.
Cecil S. Kelley
BY
Adelbert A. Steinmiller
ATTORNEY

2,777,546
AIRPLANE BRAKE EQUIPMENT

Cecil S. Kelley, Pittsburgh, Pa., assignor to Westinghouse Air Brake Company, Wilmerding, Pa., a corporation of Pennsylvania Application March 27, 1953, Serial No. 344,972

11 Claims. (Cl. 188—176)

This invention relates to brakes and more particularly to brakes in which the braking force applied to a wheel of a vehicle, such as an airplane, is controlled according to the weight supported by such wheel.

One object of the invention is to provide a simplified brake of the above type which is not dependent upon motivating means, such as fluid under pressure or electrical energy to effect brake application.

Another object of the invention is to provide an improved brake for an airplane wheel in which the brake, if applied, is automatically released when said wheel, for any reason, leaves the ground.

Other objects and advantages will become apparent from the following more detailed description of the invention.

In the accompanying drawing, Figs. 1, 2 and 3 are side elevational views, partly in section and partly in outline, of three different embodiments of the invention, respectively, each shown, by way of illustration, associated with an airplane wheel.

General description

As shown in the drawing, in each embodiment of the invention the reference numeral 1 designates an airplane wheel provided with the usual pneumatic tire 2 and mounted on an axle 3 extending transversely of the plane and adapted to turn in a clockwise direction, as viewed in the drawing, upon landing of the plane. An annular braking element to be braked, which, for the purpose of illustration, may be in the form of a brake drum 4, is secured to the wheel 1 for rotation therewith and two oppositely arranged brake shoes 5 are provided for frictional braking engagement with opposite portions of said element.

Description—Fig. 1

According to this embodiment of the invention, two oppositely arranged L-shaped levers 6 are disposed mainly above and, respectively, at the forward and rearward sides of the axle 3 and drum 4 for actuating the two brake shoes 5, respectively. Each lever 6 comprises a depending lever arm pivotally connected at its lower end to and carrying one of the brake shoes 5 through the medium of a transverse pin 7, while the end of the other arm of each such lever is pivotally connected to a fixed element, preferably the frame 8 of the airplane, through the medium of a transverse pin 9. The two levers 6 are arranged in such manner that their respective heels 10, formed at the junction of their respective arms, face each other in spaced apart lateral relationship above and forward and rearward of the axle 3, the arm of each of said levers which is connected to the respective brake shoe 5 preferably being longer than the arm connected to the frame 8 to provide desired leverage for actuating said brake shoe in a manner to be brought out in subsequent description of operation.

Two vertically disposed links 11 are pivotally connected at their lower ends, by means of transverse pins 12, to the heels 10 of the levers 6, respectively, while said links at their upper ends are pivotally connected to opposite ends of a horizontally disposed equalizing lever or yoke 13 through the medium of similar transverse pins 14, respectively. The yoke 13 is operably connected, equidistant from its ends, to a vertically disposed support rod 15 through the medium of a transverse pin 16. The axes of the pins 7, 9, 12, 14 and 16 are all parallel to the axis of the horizontal transverse axle 3 so that upon vertical movement of the airplane frame 8 relative to the support rod 15, in the manner hereinafter to be described, the yoke 13 will actuate the links 11 and levers 6 in parallel planes of pivotal movement to move the brake shoes 5 toward or away from the drum 4.

The vertical support rod 15 is disposed equidistant from and out of contact with the opposing lever heels 10, being mounted at its lower end on the horizontal axle 3 and projecting vertically upward, with substantial clearance, through a central opening 17 in a lower end wall 18 of a coaxially aligned, hollow cylindrical casing 19 to the interior of said casing, said casing being rigidly associated with the airplane frame 8.

A piston 20, slidably mounted within the casing 19, separates a pressure chamber 21 above said piston from a non-pressure chamber 22 which is below said piston and open to the atmosphere through the opening 17. The piston 20 is rigidly connected coaxially with and to the rod 15 at the upper end thereof so that when the plane is airborne, said rod, and the wheel 1 operatively connected thereto, will be carried by abutting engagement of the non-pressure face of said piston with the lower end wall 18 of the casing 19.

An operator's control valve device 25 is provided for controlling pressurization of fluid in chamber 21 to effect partial or complete release of the brake shoes 5 in the manner to be explained in subsequent description of operation. The device 25 may be of any suitable type comprising an operating handle 26 and valve means (not shown) operable by said handle for controlling flow of fluid under pressure from a supply pipe 27 to the pressure chamber 21 by way of a pipe 28, for controlling release of fluid under pressure from said chamber to an atmospheric vent pipe 29 by way of said pipe 28, and for bottling up any selected amount of fluid under pressure in said chamber.

It will be understood that while the improved brake apparatus hereinabove described is intended to be associated with each wheel to be braked (or in the case of dual wheels in heavy aircraft, with either one or both of such wheels), it is preferable that only one valve device 25 be employed in connection with all the brake apparatus associated with the respective wheels of the airplane.

A horizontal thrust bar 30 is provided for driving the wheel 1 upon touchdown and during forward movement of the airplane while taxiing and for preventing adverse cocking of the rod 15 and piston 20 at such times. The thrust bar 30 is pivotally connected at its rearward end, through the medium of a transverse pin 31, to a downwardly projecting portion of the airplane frame 8, rearward of the support rod 15, and is pivotally connected at its forward end, through the medium of a transverse pin 32, to said support rod at a point thereon intermediate the axle 3 and pin 16; the axes of pins 31 and 32 being parallel to the axis of the axle 3. The thrust bar 30 is of such length that pivotal movement thereof about the pin 31 during vertical movement of the rod 15, in the manner hereinafter to be described, will not cause any detrimental cocking of said rod and hence of piston 20 relative to the casing 19.

Operation—Fig. 1

In operation, initially assume that the airplane is at rest on the ground and that chamber 21 is devoid of fluid under pressure. Under these conditions, the frame 8 of the airplane will be supported from the wheel 1 through the medium of the rod 15, the equalizing yoke 13, links 11, and the upper ends of levers 6 connected to said frame by pins 9, respectively; the depending ends of said levers, respectively, being fixed by contact of the brake shoes 5 with the drum 4. It will be noted that by action of the weight of the airplane frame 8 acting on the upper ends of the levers 6 through the pins 9, respectively, as fulcrumed about the pins 12, the brake shoes 5 are pressed against the brake drum 4 with a force which is proportional to said weight.

Assume now that the pilot desires to effect a release of the brakes preparatory to take-off. He manually actuates the handle 26 of the valve device 25 to provide in chamber 21 by way of pipe 28, a pressure which acting on the upper closed end wall of casing 19, is sufficient to elevate the airplane frame 8 relative to piston 20 and the wheel 1 to a position in which said piston engages the lower end wall 18 of said casing. During this upward movement of the frame 8, the pins 9, carried upwardly by said frame, will rock the levers 6 about their respective relatively stationary pins 12 (the forward lever in a counter-clockwise direction and the rearward lever in a clockwise direction) and thereby move the brake shoes 5 out of binding engagement with the drum 4 to a "brake release" position defined by the contact of piston 20 with the end wall 18.

With the brakes completely released in the above described manner, assume now that the airplane is in the process of take-off. Horizontal rearward thrust from the wheel 1 during movement down the runway is transmitted to the frame 8 through the medium of the support rod 15 and thrust bar 30.

When the plane is airborne, the weight of the wheel 1 and the axle 3 will hold the piston 20 in contact with wall 18 and thereby maintain the brake shoes 5 out of engagement with the drum 4, irrespective of the pressure of fluid in the chamber 21.

Assume now that the airplane is about to land and the handle 26 of the valve device 25 is in position to provide a pressure in chamber 21 sufficient to maintain the brake shoes 5 in their previously defined "brake release" position upon touchdown and until the wheel 1, which upon touchdown will start to rotate in a clockwise direction as viewed in the drawing, accelerates to substantially ground speed, in accordance with usual landing procedure. When the wheel 1 has attained such speed, the pilot moves the handle 26 of said device into position for effecting a reduction in the pressure of fluid in chamber 21, according to the degree of braking selected. Upon reduction in the pressure of fluid in chamber 21 acting upon the upper closed end wall of casing 19, the frame 8 settles downward relative to said wheel and the support rod 15. During this downward movement of the frame 8, said frame, through the medium of the respective pins 9 carried therewith, causes the levers 6 to simultaneously rock about their relatively stationary pins 12, respectively, in directions opposite to those described in detail in connection with releasing the brakes, and move the brake shoes 5 into frictional engagement with the rotating drum 4, thereby applying a braking force to the wheel 1.

It will now be noted that if, after touchdown, the pressure of fluid in chamber 21 is reduced to atmospheric, a maximum degree of brake application will be attained, since the weight of the airplane frame 8 as carried by the wheel 1 will, under such condition, be almost completely supported by the pins 9, and the pressure of the brake shoes 5 against the drum 4 and hence the braking force thereon, consequently will be directly proportional to the entire weight of the frame, as carried on said wheel. It will also be noted that the braking force applied to each brake shoe 5 will be substantially equal by action of the equalizing yoke 13.

The degree of braking of the wheel 1 when landing, as well as when parked, may, if desired, be limited to any degree less than maximum by actuating the control valve device 25 to provide fluid in chamber 21 according to degree of partial braking selected. Fluid at such reduced pressure thus provided in chamber 21 will act on the upper closed end wall of said chamber to support directly from rod 15 a portion of the weight of the frame 8 carried by the wheel 1, thereby limiting to the remaining portion of said weight the force applied through pins 9 to the levers 6 to correspondingly limit the force with which the shoes 5 will be pressed against the drum 4 to brake wheel 1. It will therefore be seen that any desired degree of braking of said wheel may be obtained, dependent upon pressure of fluid in chamber 21, and that during landing or at other times the operator may vary the braking of said wheel as desired such, for example, as to suit varying conditions of a runway.

If during landing and after the brakes have been applied, the wheel 1 bounces and causes the frame of the airplane to move upwardly relative to said wheel to an extent where the piston 20 will move toward or into contact the lower end wall 18 of casing 19, the brakes on said wheel will be correspondingly partially or completely released, respectively, and remain so until said frame has again settled down on said wheel and caused the brakes to reapply, in the same manner as above described. It will thus be seen that this apparatus, by automatically providing for a release of the brakes under this condition, prevents the wheel from being in a locked condition at the time of subsequent touchdown, and thereby not only reduces wear on the tire 2 but also minimizes the possibility of flip-over.

*Description and operation—Fig. 2*

According to this embodiment of the invention, levers 6', generally similar to levers 6 shown in Fig. 1, are provided along their heels 10, adjacent the rod 15, with gear teeth 33 which mesh with teeth of a circular rack or gear 34 journaled on a transverse shaft 35 rigidly secured to the rod 15.

When a plane provided with this brake apparatus is on the ground with pressure chamber 21 at atmospheric pressure, the weight of the airplane frame 8 applied through the medium of pins 9 to the ends of levers 6' will actuate said levers to press the brake shoes 5 against the drum 4 to brake the wheel 1 in generally the same manner as described in connection with the structure shown in Fig. 1; the gear 34 and its connection with said levers providing for equalization of the forces applied to said shoes. When the plane is airborne, the weight of the wheel 1 will pull the piston 20 into contact with end wall 18 whereby, through the medium of gear 34, the levers 6' will be actuated to support the shoes 5 out of contact with the drum 4.

Assume now that with the chamber 21 pressurized to a degree sufficient to support the plane frame 8, the airplane is landing, and that the unbraked wheel 1 has accelerated substantially to ground speed of the plane, and that the pressure of fluid in chamber 21 has thereafter been reduced, according to the degree of braking desired, as previously described in detail. As the airplane frame 8 settles toward the wheel 1, it will move down relative to rod 15 and through the medium of gear 34 actuate the levers 6', thereby forcing the shoes 5 into contact with the brake drum 4 to brake the wheel 1 in the same manner as in the structure shown in Fig. 1; and likewise with the frame 8 in its fully settled state, the degree of braking of wheel 1 will be in proportion to the weight of said frame acting on the levers 6' through the medium of the pins 9. With chamber 21 at atmospheric pressure, substantially the full weight of the airplane frame 8 as carried by the wheel 1 will be supported by the pins 9, and consequently a maximum degree of brake application will be achieved; whereas any lesser degree of brake application may be achieved according to extent of pressurization of said chamber, which correspondingly reduces the portion of said weight supported by pins 9, as fully described in connection with the structure shown in Fig. 1. Also, as will be apparent from preceding description, if the wheel 1 bounces from the ground and pushes the frame 8 into the air, said wheel will immediately drop back toward the ground and cause immediate release of the brakes, after which the brakes will be reapplied upon subsequent touchdown of said wheel.

When the wheel 1 touches down during landing, and thereafter during running on the runway, said wheel will be driven by the airplane frame 8 through the medium of the rearward lever 6', the gear 34 (which will be held by the two levers 6' against turning) and the rod 15. If desired, however, a rod such as 30 employed in Fig. 1 may be used with this structure.

*Description and operation—Fig. 3*

According to this embodiment of the invention, the structure differs from that shown in Fig. 1 of the drawing in that two oppositely arranged bell cranks 36 are provided instead of the levers 6, and a third brake shoe 5', similar to the brake shoes 5, is disposed above the drum 4 to apply added braking force thereto and to also actuate the brake shoes 5 in the manner presently to be described. Each of the bell cranks 36 is pivotally connected at its respective knee to the frame 8 through the medium of a transverse pin 37 for rockable movement in a plane at right angles to the axis of axle 3. Each of the bell cranks 36 comprises a downwardly extending arm 38 and, at approximately a right angle thereto, a substantially horizontally extending arm 39. The arms 38 at their lower ends are pivotally connected to the brake shoes 5 through the medium of transverse pins 40, respectively, while the ends of arms 39 are pivotally connected through the medium of transverse pins 41 to opposite (forward and rearward) ends, respectively, of an equalizing link 42. The link 42 is, in turn, pivotally connected equidistant from its forward and rearward ends to the brake shoe 5', through the medium of a transverse pin 43. The axes of pins 37, 40 and 41 and of pin 43 are all parallel to the axis of the axle 3 so that the brake shoes 5 and 5' will be movable at right angles to the axis of said axle to assure full surface engagement of said shoes with the drum 4.

A horizontal thrust rod 30' is provided for driving the wheel 1 upon touchdown and during forward movement of the plane while taxing.

In operation, assuming initially that the pilot wishes to effect a release of the brakes preparatory to take off, he operates the handle 26 of control valve device 25 to pressurize chamber 21 to effect upward movement of the casing 19 and frame 8 relative to the stationary rod 15, in the manner previously described in detail in connection with the structure shown in Fig. 1 of the drawing, thereby initially causing the brake shoes 5 to be disengaged from the drum 4 and then causing said frame, acting through the bell cranks 36 and link 42, to carry the brake shoe 5' out of engagement with said drum, in the manner apparent from preceding description.

Assume now that during landing, the unbraked wheel 1 has accelerated substantially to ground speed of the airplane, and that chamber 21 has thereafter been vented to atmosphere, in the manner previously described in detail in connection with embodiment shown in Fig. 1 of the drawing. The frame 8 will now move downward under action of its weight, carrying the bell cranks 36 downward through the medium of the pins 37, respectively, and initially causing the respective bell crank arms 39, acting through the link 42, to carry the brake shoe 5' into frictional engagement with the clockwise rotating drum 4. After the brake shoe 5' has thus engaged the drum 4, continued downward movement of the frame 8 will cause the bell cranks 36 to pivot about their respective pins 37 and 41, while the link 42 remains substantially stationary, and the brake shoes 5 will be carried by said bell cranks into frictional engagement with said drum to apply a braking force to said drum. With the chamber 21 at atmospheric pressure it will be noted that the full weight of the airplane frame 8 carried by the wheel 1 is transmitted by way of the respective pins 37 to the bell cranks 36, thereby causing the brake shoes 5, 5, and 5' to brake said wheel to a degree which is directly proportional to such weight. It will also be apparent from preceding description in connection with the embodiment shown in Fig. 1 of the drawing that if the pressure of fluid in chamber 21 is only partially reduced after touchdown, the portion of the weight of the frame 8 supported by the pins 37 will be correspondingly reduced and consequently the braking force, which is directly proportional to the weight transmitted by said pins to the bell cranks 36, will likewise be correspondingly reduced.

As also will be apparent from preceding description in connection with the embodiment of the invention shown in Fig. 1 of the drawing, the degree of application of the brakes may be varied after touchdown by manual actuation of the valve device 25 to provide a pressure of fluid in chamber 21 corresponding to the degree of braking desired.

In the event the wheel 1 for any reason leaves the ground, the brakes will immediately be released, as will be apparent from detailed description in connection with the embodiment of the invention shown in Fig. 1 of the drawing.

*Summary*

It will now be seen that the invention, in each of its three embodiments, provides a brake which is relatively simple in construction and in which the weight transmitted from the airplane frame to the brake actuating levers serves to provide a brake applying force for said wheel which is directly proportional to said weight.

In all embodiments of the invention the valve device 25 is manually actuated prior to touchdown to pressurize chamber 21 so that upon touchdown the wheel 1 may accelerate to substantially the ground speed of the airplane, after which the device 25 is actuated to reduce the pressure of fluid in said chamber according to degree of braking desired, a maximum degree of braking being attained with the chamber 21 vented to atmosphere under which conditions the full weight of the airplane frame 8, as carried by the wheel 1, is carried substantially on the pins by which said frame is connected to the brake applying levers or bell cranks.

It will also be seen that if the wheel 1 bounces during landing or running along an uneven runway, resulting in upward movement of the plane body relative to said wheel, the brakes will be automatically released, partially or completely, and maintained released until the plane body settles again relative to the wheel. This is particularly desirable if the wheel leaves the ground, for it ensures that the wheel will not be in a locked condition upon subsequent touchdown and thereby avoids unnecessary wear of the wheel tire and possibility of a blowout or loss of control of the plane.

Having now described my invention, what I claim as new and desire to secure by Letters Patent, is:

1. An apparatus for braking a wheel of a vehicle having a frame vertically movable relative to said wheel, comprising in combination, annular rotatable means to be braked secured for rotation with said wheel, a plurality of braking elements for frictional braking engagement with said rotatable means, a rod rigidly connected to move vertically with said wheel, and two oppositely arranged levers each of which is pivotally connected to said frame and to one of said braking elements and is connected for rockable movement relative to said rod such that downward movement of said frame relative to said rod in direct response to the weight of said frame on said levers effects actuation of said braking elements into braking engagement with said rotatable means.

2. The combination as set forth in claim 1, including manually controllable fluid pressure actuated means operative to elevate said frame relative to said rod for effecting disengagement of said braking elements.

3. An apparatus for braking a wheel of a vehicle having a frame vertically movable relative to said wheel, comprising in combination, annular rotatable means to be braked secured for rotation with said wheel, two oppositely arranged braking elements for frictional braking engagement with said rotatable means but normally disengaged therefrom, a wheel supporting rod rigidly connected to move vertically with said wheel, a yoke rockably mounted intermediate its ends on said rod, two links pivotally connected at their one ends to, respectively, opposite ends of said yoke, two oppositely arranged L-shaped levers the respective arms of each of which are pivotally connected to said frame and to said braking elements, said levers being rockably connected at the junctions of their arms to opposite ends of said links, respectively, and operative by downward movement of said frame relative to said rod to effect engagement of said braking elements with said rotatable means, and manually controllable fluid pressure operated means for elevating said frame relative to said rod to effect disengagement of said braking elements from said rotatable means.

4. In a brake apparatus for a wheel of a vehicle having a frame vertically movable relative to said wheel, the combination of annular rotatable means to be braked connected for rotation with said wheel, two oppositely arranged braking elements for frictional braking engagement with said rotatable means, a casing rigidly associated with said frame having a vertical bore closed at its upper end, a piston slidably mounted in said bore and defining a pressure chamber between its upper end and said casing, a substantially vertical wheel-supporting rod coaxially aligned with said casing operably connected at its lower end for vertical movement with said wheel and rigidly connected at its upper end to said piston, a yoke rockably mounted intermediate its ends on said rod, two similar links pivotally connected at their upper ends to, respectively, opposite ends of said yoke, two oppositely arranged L-shaped levers rockably connected at the junction of their respective arms to lower ends of said links, said levers being pivotally connected at their upper ends to said frame and at their lower ends to said braking elements, respectively, for effecting engagement thereof with said rotatable means by downward movement of said frame relative to said rod, and means for supplying fluid at a controllable pressure to said pressure chamber to elevate said frame relative to said rod for disengaging said braking elements according to the extent of pressurization of said pressure chamber.

5. An apparatus for braking a wheel of a vehicle having a frame vertically movable relative to said wheel, comprising, in combination, annular rotatable means to be braked secured for rotation with said wheel, a braking element for frictional braking engagement with said rotatable means, wheel supporting means rigidly connected to said wheel and comprising a toothed portion, lever connected to said braking element and having teeth en- means operably connected to said frame and operatively engageable with said toothed portion whereby downward movement of said frame relative to said wheel supporting means causes rockable movement of said lever means about said toothed portion to effect actuation of said braking element into engagement with said rotatable means, and means for effecting elevation of said frame relative to said wheel supporting means for disengaging said brake element from said rotatable means.

6. In a brake apparatus for a wheel of a vehicle having a frame vertically movable relative to said wheel, the combination of annular rotatable means to be braked connected for rotation with said wheel, two oppositely arranged braking elements for frictional braking engagement with said rotatable means, a casing rigidly associated with said frame having a vertical bore closed at its upper end, a piston slidably mounted in said bore and defining a pressure chamber between its upper end and said casing, a substantially vertical wheel-supporting rod coaxially aligned wtih said casing operably connected at its lower end for vertical movement wtih said wheel and rigidly connected at its upper end to said piston, and having a toothed portion intermediate said upper and lower ends, two oppositely arranged levers each of which is pivotally connected to said frame and to one of said braking elements and having teeth engageable with said toothed portion such that downward movement of said frame relative to said rod actuates said braking elements, and manually operated brake release means for supplying fluid at a controllable pressure to said pressure chamber to elevate said frame relative to said rod for disengaging said braking elements according to the extent of pressurization of said pressure chamber.

7. An apparatus for braking a wheel of a vehicle having a frame vertically movable relative to said wheel, comprising, in combination, annular rotatable means to be braked secured for rotation with said wheel, two oppositely arranged braking elements for frictional braking engagement with said rotatable means but normally disengaged therefrom, two oppositely arranged levers of each of which is pivotally connected to said frame and to one of said braking elements, and a pilot braking element operatively connected to said levers and operative by downward movement of said frame relative to said wheel to engage said rotatable means and then cause movement of said levers for actuating said braking elements into engagement with said rotatable means.

8. The combination as set forth in claim 7, including means for elevating said frame relative to said wheel for successively effecting disengagement of said braking elements and then of said pilot braking element from said rotatable means.

9. In a brake apparatus for a wheel of a vehicle having a frame vertically movable relative to said wheel, the combination of annular rotatable means to be braked connected for rotation with said wheel, two oppositely arranged braking elements for frictional braking engagement with said rotatable means, a casing rigidly associated with said frame having a vertical bore closed at its upper end, a piston slidably mounted in said bore and defining a pressure chamber between its upper end and said casing, a substantially vertical wheel-supporting rod coaxially aligned with said casing operably connected at its lower end for vertical movement with said wheel and rigidly connected at its upper end to said piston, two oppositely arranged bell cranks each of which is operably connected at its respective knee to said frame and operatively connected at its one end to one of said braking elements, a link pivotally connected at its opposite ends to the opposite ends of said bell cranks, respectively, a pilot braking element pivotally connected to said link and operative by downward movement of said frame relative to said rod to successively engage said rotatable means and then actuate said link to effect movement of said levers for actuating said braking elements into engagement with said rotatable means, and means for supplying fluid at a controllable pressure to said pressure chamber to elevate said frame relative to said rod for successively effecting disengaging said braking elements and then said pilot braking element from said rotatable means, according to degree of pressurization of said pressure chamber.

10. An apparatus for braking a wheel of a vehicle having a frame vertically movable relative to said wheel, said apparatus comprising in combination, a load carrying element carried by said frame and having a generally vertically disposed bore closed at its upper end, movable abutment means slidably disposed in said bore and subject at its upper side to pressure of fluid in a chamber defined between it and the upper end of said bore and subject at its lower side to atmospheric pressure, rod means coaxially connected to the lower side of said movable abutment means and projecting exteriorly of said element and anchored at its projecting end for vertical movement with the wheel, a brake shoe, a brake lever pivotally connected to said brake shoe and fulcrumed on said element and operably connected to said rod means, and a communication via which fluid under pressure may be vented from said chamber for causing downward movement of the frame and element relative to said rod means for thereby causing said brake shoe to apply to the wheel a braking force corresponding to the load imposed by the frame on the wheel and via which fluid under pressure may be supplied to said chamber for causing upward movement of the frame and element relative to said rod means for effecting a reduction in such braking force of a degree corresponding to the extent of such fluid pressure induced upward movement of the frame and element.

11. An apparatus for braking a wheel of a vehicle having a frame vertically movable relative to said wheel, said apparatus comprising, in combination, a load carrying element carried by the frame and having a generally vertically disposed bore closed at its upper end, a piston slidably mounted in said bore and separating one chamber adjacent said upper end from an atmospheric chamber, communication means via which fluid under pressure may be supplied to and vented from said one chamber, a load carrying rod coaxially connected to said piston and projecting downward exteriorly of said atmospheric chamber and anchored at its projecting end for vertical movement with the wheel, a plurality of brake shoes, a plurality of brake levers each pivotally connected to one of the brake shoes, a fulcrum for each lever carried by said element, and means operably connecting said levers with each other and with said rod such that said levers will be moved automatically under action of load-induced downward movement of the frame and element relative to said rod for causing said brake shoes to apply to the wheel a braking force corresponding to the load imposed by the frame on the wheel when said one chamber is vented to atmosphere and such that said levers will be moved automatically responsively to charging of said chamber for effecting a reduction in such braking force of a degree corresponding to the extent of upward movement of said element relative to said rod as determined by the pressure of fluid in said one chamber.

References Cited in the file of this patent

UNITED STATES PATENTS

| | | |
|---|---|---|
| Re. 10,318 | Mallinckrodt | Apr. 24, 1883 |
| 162,340 | Barker | Apr. 20, 1875 |
| 1,630,514 | Bayer | May 31, 1927 |
| 2,555,184 | Butler | May 29, 1951 |